US012743316B2

(12) United States Patent
Dong et al.

(10) Patent No.: US 12,743,316 B2
(45) Date of Patent: Sep. 22, 2026

(54) RESOURCE REALLOCATION DURING A WORKLOAD RUNTIME

(71) Applicant: INTERNATIONAL BUSINESS MACHINES CORPORATION, Armonk, NY (US)

(72) Inventors: Xin Xin Dong, Beijing (CN); Mai Zeng, Shi Jing Shan (CN); Ming Qiao Shang Guan, Haidian District (CN); Wei Song, Beijing (CN); Peng Hui Jiang, Beijing (CN); Wen Zhong Liu, Haidian District (CN)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 18/535,193

(22) Filed: Dec. 11, 2023

(65) Prior Publication Data

US 2025/0190267 A1 Jun. 12, 2025

(51) Int. Cl.
*G06F 9/46* (2006.01)
*G06F 9/50* (2006.01)

(52) U.S. Cl.
CPC ............ *G06F 9/505* (2013.01); *G06F 9/5083* (2013.01)

(58) Field of Classification Search
None
See application file for complete search history.

(56) References Cited

U.S. PATENT DOCUMENTS

| | | | |
|---|---|---|---|
| 9,727,372 B2 | 8/2017 | Jensen et al. | |
| 10,554,505 B2 | 2/2020 | Ganguli et al. | |
| 10,936,374 B2 | 3/2021 | Bivens et al. | |
| 11,307,885 B1 | 4/2022 | Luciano et al. | |
| 11,507,430 B2 | 11/2022 | Subramanian et al. | |
| 2020/0057675 A1* | 2/2020 | Dias | G06N 3/0499 |
| 2022/0035679 A1* | 2/2022 | Sunwoo | G06N 3/09 |

FOREIGN PATENT DOCUMENTS

| | | |
|---|---|---|
| CN | 107491351 | 7/2021 |

* cited by examiner

*Primary Examiner* — Bing Zhao

(74) *Attorney, Agent, or Firm* — Seed Intellectual Property Law Group LLP

(57) ABSTRACT

A computer-implemented method for receiving, by a processor set, a workload for processing. The processor set may further collect historical data and real-time data related to processing the received workload and generate a feature map by investigating the received workload, the historical data, and the real-time data. The processor set may further divide the workload into workload steps and assign each workload step to one of a plurality of groups. System resources may also be calculated for each of the workload steps. The processor set trains a machine learning model to determine influence factors for each of the plurality of groups, and then, the processor set reallocates the workload steps based on the calculated system resources and the influence factors.

20 Claims, 8 Drawing Sheets

| StepID | CPU utilization | Network | Storage | Cache | I/O | Database |
|---|---|---|---|---|---|---|
| A1_O1_S1 | -0.36 | -0.76 | 0.11 | 0.05 | -0.03 | -0.3 |
| A1_O1_S2 | 1.22 | 0.18 | 0.1 | 0.07 | 0.43 | 0.78 |
| A2_O2_S1 | -0.76 | 1.62 | 0.07 | -0.02 | -0.01 | -0.13 |
| A3_O1_S3 | -0.41 | -0.73 | -0.06 | 0.08 | -0.03 | -0.08 |

RESOURCE REALLOCATION DURING A WORKLOAD RUNTIME

BACKGROUND

Aspects of the present invention relate generally to training and using machine-learning algorithms and artificial intelligence using data captured based on a database workload.

Over the last decade, there has been an explosion of applications for artificial intelligence (AI). In that time, AI has gone from generally a purely academic endeavor to a force powering actions across myriad industries and affecting the lives of millions each day.

In recent years, AI systems have been built to learn from thousands, or millions, of examples to help the world better understand everything around us, or to find new solutions to difficult problems. These large-scale models have led to systems that can understand written- and spoken-language, such as the natural-language processing and understanding programs that are used every day, from digital assistants to speech-to-text programs. Other systems, trained on things like images, entire works of famous artists, or every chemistry textbook in existence, have paved the way for generative models that can identify the origin of works, create new works based on historical images and styles, or new compound ideas based on the history of chemical research.

SUMMARY

In a first aspect of the invention, there is a computer-implemented method including: receiving, by a processor set, a workload for processing; collecting, by the processor set, historical data and real-time data related to processing the received workload; generating, by the processor set, a feature map by investigating the received workload, the historical data, and the real-time data; dividing, by the processor set, the workload into workload steps; assigning, by the processor set, each workload step of the workload steps to one of a plurality of groups; calculating, by the processor set, system resources for each of the workload steps; training, by the processor set, a first machine learning model to determine influence factors for each of the plurality of groups; and reallocating, by the processor set, the workload steps to one of a plurality of processing nodes based on the calculated system resources and the influence factors.

In another aspect of the invention, there is a computer program product including one or more computer readable storage media having program instructions collectively stored on the one or more computer readable storage media. The program instructions are executable to: receive a workload for processing; collect historical data and real-time data related to processing the received workload; generate a feature map by investigating the received workload, the historical data, and the real-time data; divide the workload into workload steps; assign each workload step of the workload steps to one of a plurality of groups; calculate system resources for each of the workload steps; train a first machine learning model to determine influence factors for each of the plurality of groups; and reallocate the workload steps to one of a plurality of processing nodes based on the calculated system resources and the influence factors.

In another aspect of the invention, there is a system including a processor set, one or more computer readable storage media, and program instructions collectively stored on the one or more computer readable storage media. The program instructions are executable to: receive a workload for processing; collect historical data and real-time data related to processing the received workload; generate a feature map by investigating the received workload, the historical data, and the real-time data; divide the workload into workload steps; assign each workload step of the workload steps to one of a plurality of groups; calculate system resources for each of the workload steps; train a first machine learning model to determine influence factors for each of the plurality of groups; and reallocate the workload steps to one of a plurality of processing nodes based on the calculated system resources and the influence factors.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
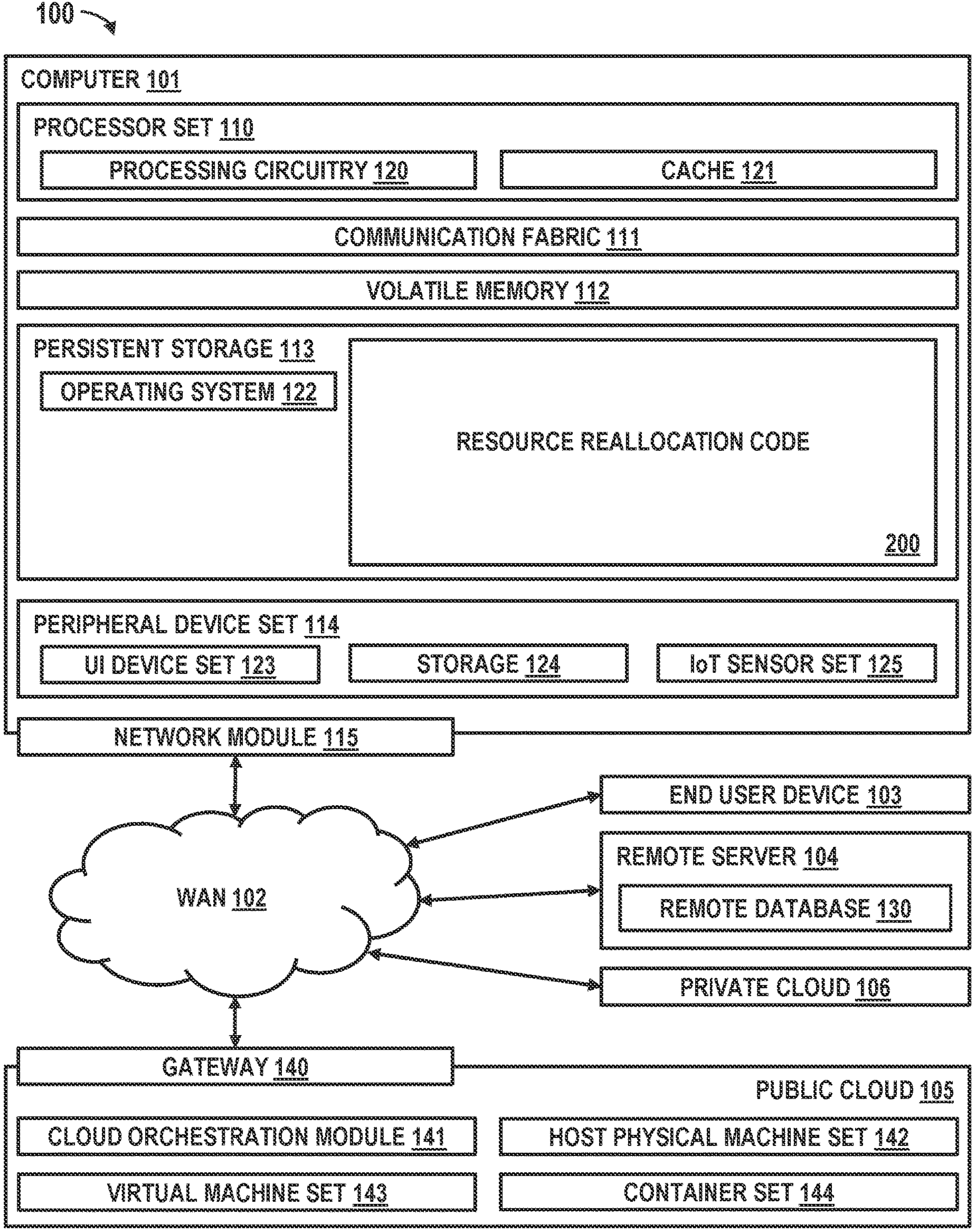
FIG. 1 depicts a computing environment according to an embodiment of the present invention.

Aspects of the present invention relate generally to training and using machine-learning algorithms and artificial intelligence using data captured based on a database workload. The machine-learning algorithms and artificial intelligence are generally trained to reallocate system resources to process a processing workload such that the workloads can run more smoothly, more efficiently, and can take full advantage of system resources.

According to an aspect of the invention, there is a computer-implemented method for reallocating system resources for processing a workload, the computer-implemented method including: collecting system performance and batch workload data, and regrouping the workload data into different groups based on steps, dependencies, and resource requirements of the collected system performance and batch workload data; training a machine learning model using a system scoring module for every system node based on the collected system performance and batch workload data; training a machine learning model for a new workload group and an influence factor for every row data; and determining whether the system is healthy (or not healthy) by calculating a system score based on the system scoring module and the influence factor to allocate appropriate system resources for a processing step.

According to an aspect of the invention, there is a computer-implemented method including: receiving, by a processor set, a workload for processing; collecting, by the processor set, historical data and real-time data related to processing the received workload; generating, by the processor set, a feature map by investigating the received workload, the historical data, and the real-time data; dividing, by the processor set, the workload into workload steps; assigning, by the processor set, each workload step of the workload steps to one of a plurality of groups; calculating, by the processor set, system resources for each of the workload steps; training, by the processor set, a first machine learning model to determine influence factors for each of the plurality of groups; and reallocating, by the processor set, the workload steps to one of a plurality of processing nodes based on the calculated system resources and the influence factors. The foregoing features provide a method that improves the allocation of system resources to perform database management tasks more smoothly, more efficiently, and to take full advantage of system resources.

In embodiments, the method further includes reformatting the historical data and the real-time data. By reformatting the historical and real-time data, the method will operate more efficiently when using data that has been reformatted to better fit, and be more compatible with, the processing.

In embodiments, the method further includes generating an updated feature map based on the calculated system resource for each step, wherein the reallocating the workload steps is further based on the updated feature map. The foregoing feature helps to improve the method's allocation of system resources to perform database management tasks more smoothly, more efficiently, and to take full advantage of system resources.

In embodiments, the method further includes training a second machine learning model to determine a first system score for at least one of the plurality of processing nodes, and where the reallocating the workload steps is further based on the first system score. Training a second machine learning model based on a first system score and reallocating the workload steps based on the first system score helps to improve the method's allocation of system resources to perform database management tasks more smoothly, more efficiently, and to take full advantage of system resources.

In embodiments, the method further includes retraining the second machine learning model to determine a second system score for at least one of the plurality of processing nodes, and where the reallocating the workload steps is further based on the second system score. Retraining a second machine learning model based on a second system score and reallocating the workload steps based on the second system score helps to improve the method's allocation of system resources to perform database management tasks more smoothly, more efficiently, and to take full advantage of system resources.

In embodiments, the method further includes transmitting the reallocated workload steps as an updated processing workload for processing by a selected processing node. This feature allows the more efficient reallocated workload steps to be transmitted to a processing node for processing.

In embodiments, the selected processing node is selected based on determining whether a target node is healthy and whether a current system data is below a second threshold. By selecting a healthy target node when a current system data is below a second threshold, the method ensures that the system resources are capable of processing the reallocated workload steps more smoothly, more efficiently, and to take full advantage of system resources.

In embodiments, the selected processing node is selected based on determining whether a target node is healthy, whether a current system data is below a second threshold, and whether an influence factor of the influence factors is non-limiting. By selecting a healthy target node, when a current system data is below a second threshold, and when the influence factor is non-limiting, the method ensures that the system resources are capable of processing the reallocated workload steps more smoothly, more efficiently, and to take full advantage of system resources.

According to an aspect of the invention, there is a computer program product including one or more computer readable storage media having program instructions collectively stored on the one or more computer readable storage media. The program instructions are executable to: receive a workload for processing; collect historical data and real-time data related to processing the received workload; generate a feature map by investigating the received workload, the historical data, and the real-time data; divide the workload into workload steps; assign each workload step of the workload steps to one of a plurality of groups; calculate system resources for each of the workload steps; train a first machine learning model to determine influence factors for each of the plurality of groups; and reallocate the workload steps to one of a plurality of processing nodes based on the calculated system resources and the influence factors. The foregoing features provide a computer program product that improves the allocation of system resources to perform database management tasks more smoothly, more efficiently, and to take full advantage of system resources.

In embodiments, the computer program product further includes program instructions for reformatting the historical data and the real-time data. By reformatting the historical and real-time data, the computer program product will operate more efficiently when using data that has been reformatted to better fit, and be more compatible with, the processing.

In embodiments, the computer program product further includes program instructions for generating an updated feature map based on the calculated system resource for each step, wherein the reallocating the workload steps is further based on the updated feature map. The foregoing feature helps to improve the computer program product's allocation of system resources to perform database management tasks more smoothly, more efficiently, and to take full advantage of system resources.

In embodiments, the computer program product further includes program instructions for training a second machine learning model to determine a first system score for at least one of the plurality of processing nodes, and where the reallocating the workload steps is further based on the first system score. Training a second machine learning model based on a first system score and reallocating the workload steps based on the first system score helps to improve the computer program product's allocation of system resources to perform database management tasks more smoothly, more efficiently, and to take full advantage of system resources.

In embodiments, the computer program product further includes program instructions for retraining the second machine learning model to determine a second system score for at least one of the plurality of processing nodes, and where the reallocating the workload steps is further based on the second system score. Retraining a second machine learning model based on a second system score and reallocating the workload steps based on the second system score helps to improve the computer program product's allocation of system resources to perform database management tasks more smoothly, more efficiently, and to take full advantage of system resources.

In embodiments, the computer program product further includes program instructions for transmitting the reallocated workload steps as an updated processing workload for processing by a selected processing node. This feature allows the more efficient reallocated workload steps to be transmitted to a processing node for processing.

In embodiments, the selected processing node is selected based on determining whether a target node is healthy and whether a current system data is below a second threshold. By selecting a healthy target node when a current system data is below a second threshold, the computer program product ensures that the system resources are capable of processing the reallocated workload steps more smoothly, more efficiently, and to take full advantage of system resources.

In embodiments, the selected processing node is selected based on determining whether a target node is healthy, whether a current system data is below a second threshold, and whether an influence factor of the influence factors is non-limiting. By selecting a healthy target node, when a current system data is below a second threshold, and when the influence factor is non-limiting, the computer program product ensures that the system resources are capable of processing the reallocated workload steps more smoothly, more efficiently, and to take full advantage of system resources.

According to an aspect of the invention, there is a system including a processor set, one or more computer readable storage media, and program instructions collectively stored on the one or more computer readable storage media. The program instructions are executable to: receive a workload for processing; collect historical data and real-time data related to processing the received workload; generate a feature map by investigating the received workload, the historical data, and the real-time data; divide the workload into workload steps; assign each workload step of the workload steps to one of a plurality of groups; calculate system resources for each of the workload steps; train a first machine learning model to determine influence factors for each of the plurality of groups; and reallocate the workload steps to one of a plurality of processing nodes based on the calculated system resources and the influence factors. The foregoing features provide a system that improves the allocation of system resources to perform database management tasks more smoothly, more efficiently, and to take full advantage of system resources.

In embodiments, the program instructions are further executable to generate an updated feature map based on the calculated system resource for each step, wherein the reallocating the workload steps is further based on the updated feature map. The foregoing feature helps to improve the system's allocation of system resources to perform database management tasks more smoothly, more efficiently, and to take full advantage of system resources.

In embodiments, the program instructions are further executable to train a second machine learning model to determine a first system score for at least one of the plurality of processing nodes, and where the reallocating the workload steps is further based on the first system score. Training a second machine learning model based on a first system score and reallocating the workload steps based on the first system score helps to improve the system's allocation of system resources to perform database management tasks more smoothly, more efficiently, and to take full advantage of system resources.

In embodiments, the program instructions are further executable to retrain the second machine learning model to determine a second system score for at least one of the plurality of processing nodes, and where the reallocating the workload steps is further based on the second system score. Retraining a second machine learning model based on a second system score and reallocating the workload steps based on the second system score helps to improve the system's allocation of system resources to perform database management tasks more smoothly, more efficiently, and to take full advantage of system resources.

A workload consists of multiple batch jobs, which are standalone jobs without human interaction. A workload typically runs data in bulk streams, such as updating over 1 million rows of/in a database on a daily or nightly basis. These daily/nightly tasks use vast amounts of storage, central processing unit (CPU) time and power, and input/output resources. In some cases, the system must generate a system report summarizing the updating workloads that were completed during the daily/nightly tasks.

The described database management workloads, and workloads in general, are defined by operators, usually using a workload scheduler, and they are submitted in applications or in a batch. In many cases, the submitted applications/batches have large amounts of external and internal data/task dependencies. The applications/batches are submitted with some regularity and are grouped without considering the overall health of the system(s) performing the work. As a result, issues are often created when many workloads are running (i.e., processing) at same time.

In general, a system may receive numerous requests for data processing, the system typically breaks down the requests into multiple jobs, which combine to create the overall workload. Each job within the workload may have a specific goal to be accomplished as well as a specific level of importance. In some instances, existing systems prioritize importance over meeting goals (or vice versa), and the resulting processing is not smooth, is not efficient, and does not take full advantage of system resources.

Embodiments and aspects of the invention provide a system and method that improves and advances the technology in a specific and practical application. In other words, embodiments and aspects of the invention improve the allocation of system resources to perform database management tasks more smoothly, more efficiently, and can take full advantage of system resources. According to aspects of the invention, a data collection module collects system performance data and batch workload data while a data processing module regroups workload data into different groups based on steps, dependencies, resource requirements of the collected system performance data and batch workload data. A system scoring module trains a machine learning model for every system node, based on the collected system performance data and batch workload data. A factor identifying module trains models for every new workload group and generates an influence factor for every element. A resource reallocation module calculates system score, based on the system scoring module, by calculating an influence factor for the target step based on the factor identify module. If it is determined that the current resource allocation is not healthy for the overall system or if the influence factor is limiting, the resource reallocation module reallocates appropriate system resources to perform the processing step(s).

Implementations of the invention are necessarily rooted in computer technology. For example, the steps of receiving a workload for processing; collecting historical data and real-time data related to processing the received workload; generating a feature map by investigating the received workload, the historical data, and the real-time data; training a first machine learning model to determine influence factors for each of the plurality of groups; and reallocating the workload steps to one of a plurality of processing nodes based on the calculated system resources and the influence factors, are computer-based, are very complex, and cannot be performed in the human mind. Training and using a machine learning model are, by definition, performed by a computer and cannot practically be performed in the human mind (or with pen and paper) due to the complexity and massive amounts of calculations involved. For example, an artificial neural network may have millions or even billions of weights that represent connections between nodes in different layers of the model. Values of these weights are adjusted, e.g., via backpropagation or stochastic gradient descent, when training the model and are utilized in calculations when using the trained model to generate an output in real time (or near real time). Given this scale and complexity, it is simply not possible for the human mind, or for a person using pen and paper, to perform the number of calculations involved in training and/or using a machine learning model.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as resource reallocation code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
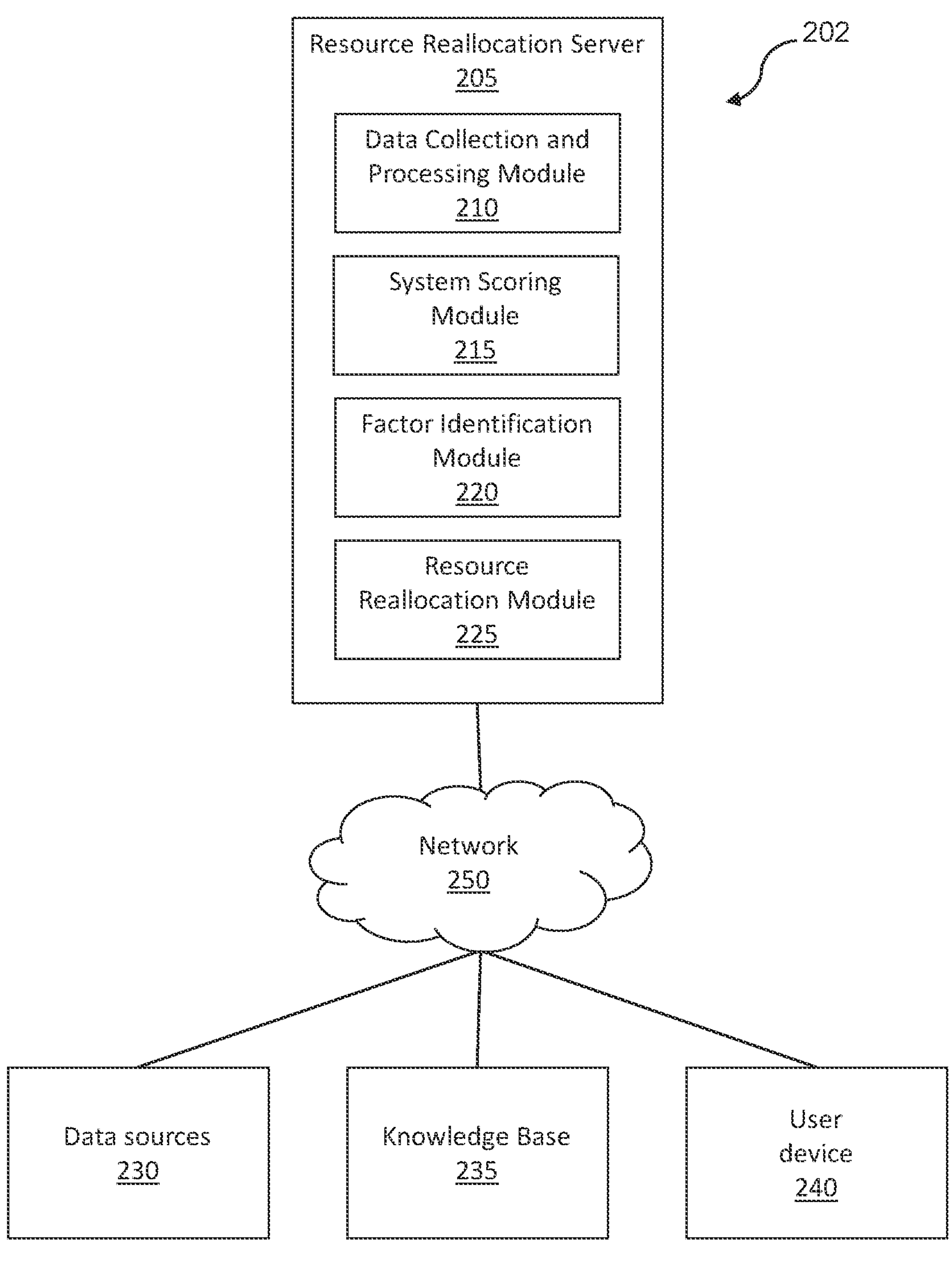
FIG. 2 shows a block diagram of an exemplary environment in accordance with aspects of the present invention.

FIG. 2 shows a block diagram of exemplary environment 202 in accordance with aspects of the invention. In embodiments, environment 202 includes resource reallocation server 205, data sources 230, knowledge base 235, user device 240, and network 250.

Resource reallocation server 205 may comprise one or more instances of computer 101 of FIG. 1. In another example, resource reallocation server 205 may comprise one or more virtual machines or containers running on one or more instances of computer 101 of FIG. 1. In embodiments, resource reallocation server 205 communicates with data sources 230, knowledge base 235, and user device 240 via network 250, which may comprise WAN 102 of FIG. 1. In embodiments, data sources 230 comprise one or more data sources each comprising an instance of remote database 130 and/or remote server 104 of FIG. 1. In embodiments, knowledge base 235 comprises one or more knowledge bases each comprising an instance of remote database 130 and/or remote server 104 of FIG. 1. In embodiments, user device 240 comprises an instance of end user device 103 of FIG. 1. There may be plural different instances of user device 240 including, for example, user-accessible servers and personal computing devices. The different instances of user device 240 may be used by different users and evaluators, respectively.

In embodiments, resource reallocation server 205 of FIG. 2 comprises data collection and processing module 210, system scoring module 215, factor identification module 220, and resource reallocation module 225, each of which may comprise modules of resource reallocation code of block 200 of FIG. 1. Such modules may include routines, programs, objects, components, logic, data structures, and so on that perform a particular task (or tasks) or implement a particular data type (or types) that the resource reallocation code of block 200 uses to carry out the functions and/or methodologies of embodiments of the invention as described herein. These modules of resource reallocation code of block 200 are executable by computer 101 of FIG. 1 (e.g., processing circuitry 120 of FIG. 1) to perform the inventive methods as described herein. The resource reallocation server 205 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, data collection and processing module 210 is configured to collect and format both historical data and real time data that can be used to determine the overall health of the workload management processing. Data collection and processing module 210 collects system data including system layer data such as CPU utilization, initiator, storage usage, input/output threshold, and more. The collected data may also include system policy information, such as CPU utilization cannot exceed 80% and/or storage usage may not exceed 90%, or any other system policy that may be specified by a system operator. Data collection and processing module 210 also collects workload data such as dependencies among applications and occurrences (e.g., steps), a critical path, job severity (i.e., importance), time dependent tasks, system resource usage/availability, and service class. The collected data may also include workload policy information, such as a prioritized workload preferably running on a busy node. In embodiments, continuous data may be formatted to different data classes based on a profile specified by a system operator. As used herein a service class or data class is a named group of work within a workload with similar performance goals, resource requirements, and/or severity/importance.

In embodiment, data collection and processing module 210 may investigate a workload and generate a feature map based on the collected historical and real time data. In a workload, there are complex relationships within the workload and with data and applications outside the workload. In embodiments, a single application may have multiple operations within its workload and each of the multiple operations may have internal dependencies, meaning, each operation depends on data within the application and cannot run until they receive the results of a preceding step. In other embodiments, a single application may have multiple operations within its workload and each of the multiple operations may have external dependencies, meaning, each operation depends on data outside the application and cannot run until they receive the results of a preceding step from outside the application. In other embodiments, a single application may have multiple operations within its workload and the multiple operations may have both internal and external dependencies. The relationships become relatively complex, therefore data collection and processing module 210 investigates a workload and generates a feature map based on the collected historical and real time data describing the internal and external dependencies and other relationships between workload steps.

In accordance with aspects of the invention, system scoring module 215 is configured to create a model of every node. According to an aspect of the invention, system scoring module 215 gathers the historical and real time data collected by data collection and processing module 210. System scoring module 215 divides the gathered data into a bin for training data and a bin for testing data. System scoring module 215 uses the training data to train a model of every node based on machine learning data (i.e., <M1, M2, M3, Mn>). Then, using the testing data within the models, system scoring module 215 generates a final scoring model based on the performance of the models of every node using: Score(M)=f (<M1, M2, M3, Mn>). If the calculated model scores are below a predetermined threshold, the models may be retrained and retested, until a desired/acceptable score is achieved. In embodiments, the predetermined threshold may be determined based on, for example, a specific quality of service (QOS) or utilization rate.

In accordance with aspects of the invention, factor identification module 220 is configured to divide the workload into groups and generate a model map for every group. Specifically, factor identification module 220 redesigns the workload by generating new groups of various steps within the workload. Factor identification module 220 divides the training data and testing data from system scoring module 215 and trains a model, using one or more machine learning algorithms, to determine an influence factor for every row of data in every group. As used herein, an influence factor is a factor (e.g., value) that indicates the usage and/or availability of a specific resource for each step within the workload. In embodiments, specific resources may include, for example, CPU utilization rate, storage availability and/or usage rate, network usage rate, cache availability and/or usage, input/output usage, database usage, and more, as shown in block 520 of FIG. 5, described below.

In accordance with aspects of the invention, resource reallocation module 225 is configured to intelligently choose suitable nodes based on the collected historical and real time data and based on data captured by data collection and processing module 210, system scoring module 215, and factor identification module 220. Resource reallocation module 225 schedules the workload running in the environment/system based on the intelligently chosen nodes.

Figure 3A:
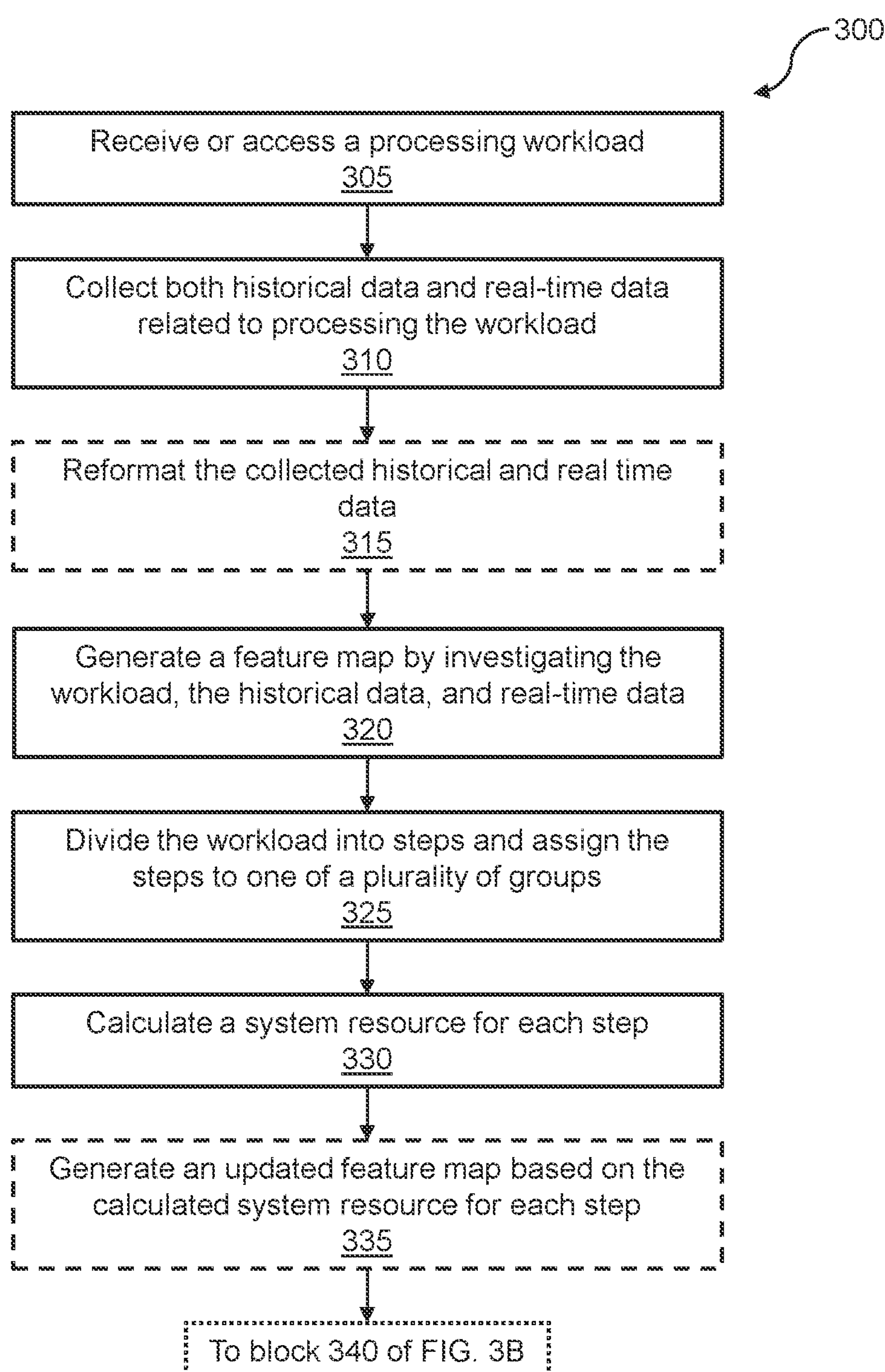
FIGS. 3A and 3B show a flowchart of an exemplary method in accordance with aspects of the present invention.
Figure 3B:
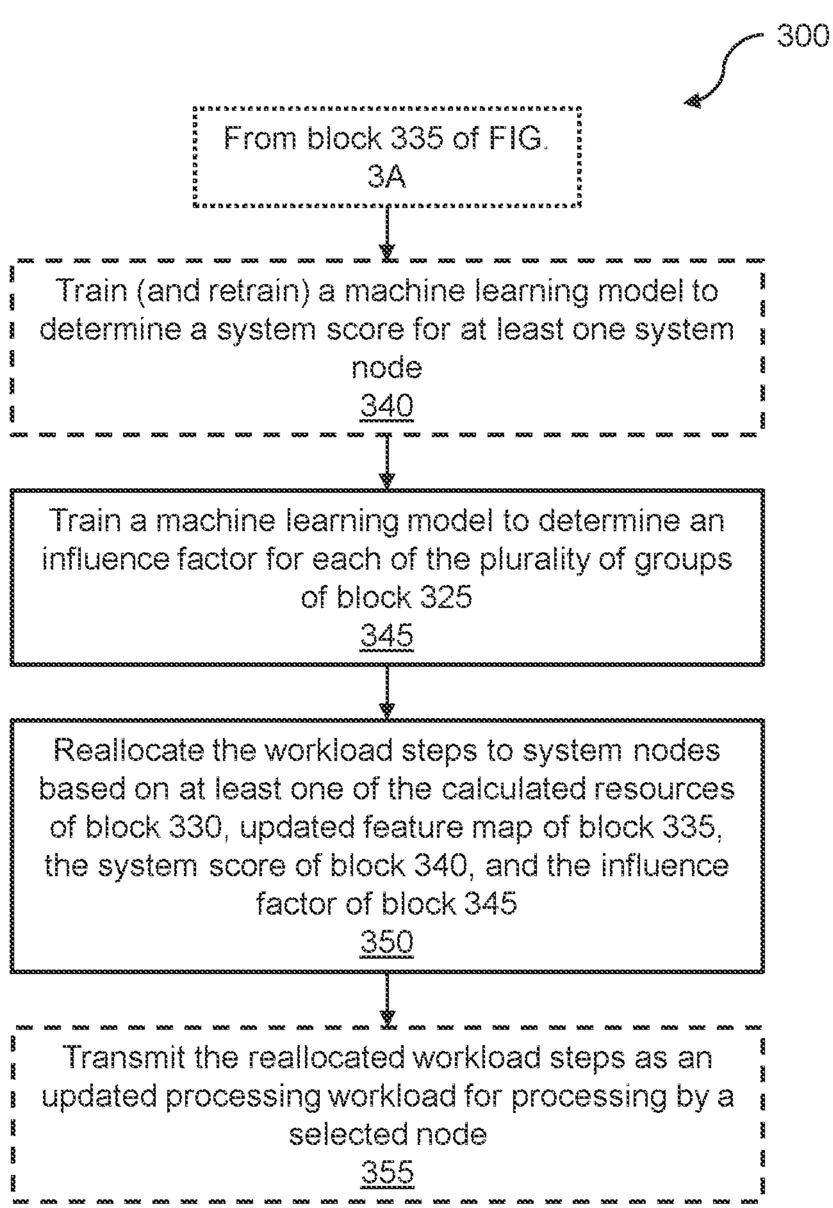

FIGS. 3A-B show a flowchart of an exemplary method 300 in accordance with aspects of the present invention. Steps of method 300 may be carried out in the environment of FIG. 2 and are described with reference to elements depicted in FIG. 2.

At block 305, resource reallocation server 205 of FIG. 2 receives or otherwise accesses a workload. As used herein, a workload generally comprises multiple batch jobs which are stand alone processing jobs that do not generally involve human intervention or interaction. Workloads typically run data in bulk streams, such as updating over a million rows of a database on a daily/nightly basis. Thus, when the system receives or accesses a workload, it may be in the form of a list of multiple batch jobs to be completed during a specific time. In embodiments the workload may be received from a data source (such as data sources 230 of FIG. 2), a knowledge base (such as knowledge base 235 of FIG. 2), and/or a user device (such as user device 240 of FIG. 2) via a network (such as network 250 of FIG. 2). In other embodiments, the workload may be accessed at a data source (such as data sources 230), a knowledge base (such as knowledge base 235) via a network (such as network 250).

At block 310, data collection and processing module 210 of FIG. 2 collects both historical data and real-time data related to processing the workload. As noted above, data collection and processing module 210 collects historical and real-time system data including system layer data such as CPU utilization, initiator, storage usage, input/output threshold, and more. The collected data may also include system policy information, such as CPU utilization cannot exceed 80% and/or storage usage may not exceed 90%, or any other system policy that may be specified by a system operator. Data collection and processing module 210 also collects workload data such as dependencies among applications and occurrences (e.g., steps), a critical path, job severity (i.e., importance), time dependent tasks, system resource usage/availability, and service class. The collected data may also include workload policy information, such as a prioritized workload preferably running on a busy node. At block 315, data collection and processing module 210 of FIG. 2 may optionally reformat the collected historical and real-time data into a format more compatible with the systems, methods, and computer program products described herein.

At block 320, data collection and processing module 210 of FIG. 2 generates a feature map by investigating the received/accessed workload, the historical data, and real-time data. In a workload, there are complex relationships within the workload and with data and applications outside the workload. In embodiments, a single application may have multiple operations within its workload and each of the multiple operations may have internal dependencies, meaning, each operation depends on data within the application. In other embodiments, a single application may have multiple operations within its workload and each of the multiple operations may have external dependencies, meaning, each operation depends on data outside the application. And in other embodiments, a single application may have multiple operations within its workload and the multiple operations may have both internal and external dependencies. The relationships become relatively complex, therefore data collection and processing module 210 investigates a workload and generates a feature map based on the collected historical and real time data describing the internal and external dependencies and other relationships between workload steps. As used herein, a feature map comprises a set of functions that map the original data to a new set of features that better capture the underlying patterns in the data. In embodiments, the feature map may include mapping the internal and external dependencies to create an ordered set of functions.

At block 325, factor identification module 220 of FIG. 2 divides the received/accessed workload into steps and assigns the steps to one of a plurality of groups. Specifically, factor identification module 220 redesigns the workload by generating new groups of various steps within the workload. In embodiments, the relationship between steps within the workload is converted into a digraph (also referred to as directed graph) diagram composed of points called vertices (or nodes) and arrows called arcs going from a vertex to a vertex. In embodiments, the digraph shows the connectivity and interconnectivity of the steps of the workload and the steps of the groups.

At block 330, factor identification module 220 of FIG. 2 calculates a system resource for each step of the workload/group. In embodiments, the calculated system resource may include CPU utilization, storage usage, network usage, cache availability and usage, input/output availability and usage, database usage, and more. In embodiments, portions of resource reallocation server 205 may use the calculated system resources, for example, to determine more efficient data paths and/or more efficient options for reallocating workload steps to more suitable system resources (e.g., nodes). At block 335, factor identification module 220 of FIG. 2 optionally generates an updated feature map based on the calculated system resource for each step.

At block 340, system scoring module 215 of FIG. 2 optionally trains, and in embodiments retrains, a machine learning model to determine a system score for at least one of a system nodes. According to an aspect of the invention, system scoring module 215 gathers the historical and real time data collected by data collection and processing module 210. System scoring module 215 divides the gathered data into a bin for training data and a bin for testing data and uses the training data to train a model of every node based on machine learning data (i.e., <M1, M2, M3, Mn>). Then, using the testing data within the models, system scoring module 215 generates a final scoring model based on the performance of the models of every node using: Score(M)=f (<M1, M2, M3, Mn>). If the calculated model scores are below a predetermined threshold, the models may be retrained and retested, until a desired/acceptable score is achieved. In embodiments, the predetermined threshold may be determined based on, for example, a specific quality of service (QoS), CPU utilization rate, storage availability and/or usage rate, network usage rate, cache availability and/or usage, input/output usage, database usage, and more. In embodiments, portions of resource reallocation server 205 may use the scoring model results, for example, to determine more efficient data paths and/or more efficient options for reallocating workload steps to more suitable system resources (e.g., nodes).

At block 345, factor identification module 220 of FIG. 2 trains a machine learning model to determine an influence factor for each of the plurality of groups of block 325 above. That is, factor identification module 220 is configured to divide the workload into groups and generate a model map for every group. Specifically, factor identification module 220 redesigns the workload by generating new groups of various steps within the workload. Factor identification module 220 divides the training data and testing data from system scoring module 215 and trains a model, using one or more machine learning algorithms, to determine an influence factor for every row of data in every group. In embodiments, determining an influence factor for every row of data in every group further includes determining whether each influence factor is limiting or non-limiting. In embodiments, portions of resource reallocation server 205 may use the influence factors, for example, to determine more efficient data paths and/or more efficient options for reallocating workload steps to more suitable system resources (e.g., nodes). For example, if an influence factor associated with a target node is non-limiting, then the target node may be appropriate for carrying out the workload step. However, if the influence factor associated with the target node is limiting, meaning there target node does not have the resources to process the workload step, then the workload step may be reallocated to another processing node.

At block 350, resource reallocation module 225 of FIG. 2 reallocates the workload steps to specific system nodes based on at least one of the calculated resources of block 330, updated feature map of block 335, the system score of block 340, and/or the influence factor of block 345. In this manner the steps of the incoming workload are regrouped into quasi new workloads and are run in steps and each step is performed at/by a suitable system resource (e.g., node) such that the workloads can run more smoothly, more efficiently, and can take full advantage of system resources.

In an embodiment the system may train a second machine learning model to determine a first system score for at least one of the plurality of processing nodes (e.g., as described with respect to block 345), where reallocating the workload steps (e.g., as described with respect to block 350) is further based on the first system score. In additional embodiments, the system may retrain the second machine learning model to determine a second system score for at least one of the plurality of processing nodes (e.g., as described with respect to block 345), where reallocating the workload steps (e.g., as described with respect to block 350) is further based on the second system score.

At block 355, resource reallocation server 205 of FIG. 2 optionally transmits the reallocated workload steps as an updated processing workload for processing by a selected node. In embodiments, the updated processing workload may be transmitted to a data source (such as data sources 230 of FIG. 2), a knowledge base (such as knowledge base 235 of FIG. 2), and/or a user device (such as user device 240 of FIG. 2) via a network (such as network 250 of FIG. 2). In other embodiments, the workload may be stored locally. In embodiments where the updated processing workload is stored locally, another processing system may access the updated processing workload at resource reallocation server 205.

Figure 4:
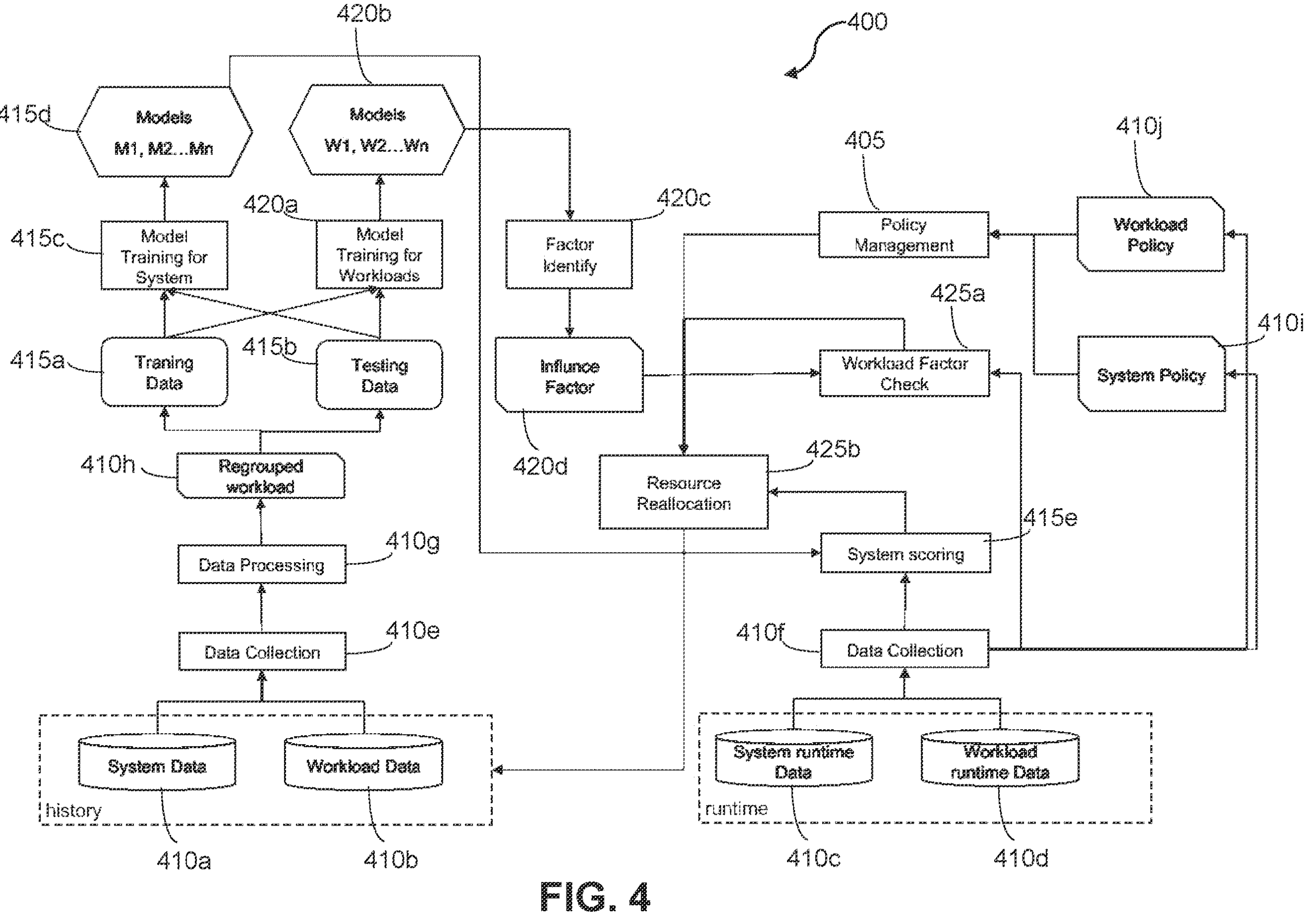
FIG. 4 shows an architecture and diagram of an exemplary system in accordance with aspects of the present invention.

FIG. 4 shows system architecture and diagram 400 of an exemplary system in accordance with aspects of the present invention. In embodiments, system architecture and diagram 400 may be carried out in the environment of FIG. 2 and are described with reference to elements depicted in FIG. 2. Specifically, the reference numbers used in FIG. 4 to represent portions of system architecture and diagram 400 are specifically used to highlight which module within resource reallocation server 205 is performing the operation. For example, in embodiments the operations labeled using reference numbers 410*a-j* are performed by data collection and processing module 210 of FIG. 2. In embodiments, the operations labeled using reference numbers 415*a-e* are performed by system scoring module 215 of FIG. 2, and so forth. In this manner, FIG. 4 shows how each of the modules of resource reallocation server 205 might, in some embodiments, interact so that the workloads can run more smoothly, more efficiently, and can take full advantage of system resources.

As described above, in accordance with aspects of the invention, data collection and processing module 210 is configured to collect and format both historical data 410*a-b* and real time data 410*c-d* that can be used to determine the overall health of the workload management processing. Data collection and processing module 210 collects system data 410*e-f* including system layer data 410*a* and 410*c* such as CPU utilization, initiator, storage usage, input/output threshold, and more. The collected data may also include system policy information 410*i*, such as CPU utilization cannot exceed 80% and/or storage usage may not exceed 90%, or any other system policy that may be specified by a system operator. Data collection and processing module 210 also collects workload data 410*b* and 410*d* such as dependencies among applications and occurrences (e.g., steps), a critical path, job severity (i.e., importance), time dependent tasks, system resource usage/availability, and service class. The collected data may also include workload policy information 410*j*, such as a prioritized workload preferably running on a busy node. In embodiments, continuous data may be formatted and processed 410*g* and 410*h*) to different data classes based on a profile specified by a system operator. In embodiments, policy management 405 may be governed by a system operator and/or predefined policy management rules/guidelines at the resource reallocation server 205.

As described above, in accordance with aspects of the invention, system scoring module 215 is configured to create a model of every node. According to an aspect of the invention, system scoring module 215 gathers the historical and real time data collected by data collection and processing module 210. System scoring module 215 divides the gathered data into training data bin 415*a* and testing data bin 415*b*. System scoring module 215 uses the training data bin 415*a* data, and testing data bin 415*b* data, to test and train models 415*d* based on training for system 415*c* for every node based on machine learning data (i.e., <M1, M2, M3, Mn>). Then, using the testing data within the models, system scoring module 215 generates a final scoring model at scoring system 415*e* based on the performance of the models of every node using: Score(M)=f (<M1, M2, M3, Mn>).

As explained above, in accordance with aspects of the invention, factor identification module 220 is configured to divide the workload into groups and generate a model map for every group. In embodiments, factor identification module 220 is configured to use training data bin 415*a* and testing data bin 415*b*, as divided by system scoring module 215. Factor identification module 220 redesigns the workload by generating new groups of various steps within the workload. Factor identification module 220 divides the training data and testing data from system scoring module 215 and trains workload models 420*b* (e.g., W1, W2 . . . Wn) at model training for workloads 420*a*, using one or more machine learning algorithms, to identify and determine influence factors 420*c-d* for every row of data in every group.

As explained above, in accordance with aspects of the invention, resource reallocation module 225 is configured to intelligently choose suitable nodes based on the collected historical and real time data and based on data captured by data collection and processing module 210, system scoring module 215, and factor identification module 220, and thereby perform workload factor check 425*a* and perform resource reallocation 425*b*.

Figure 5:
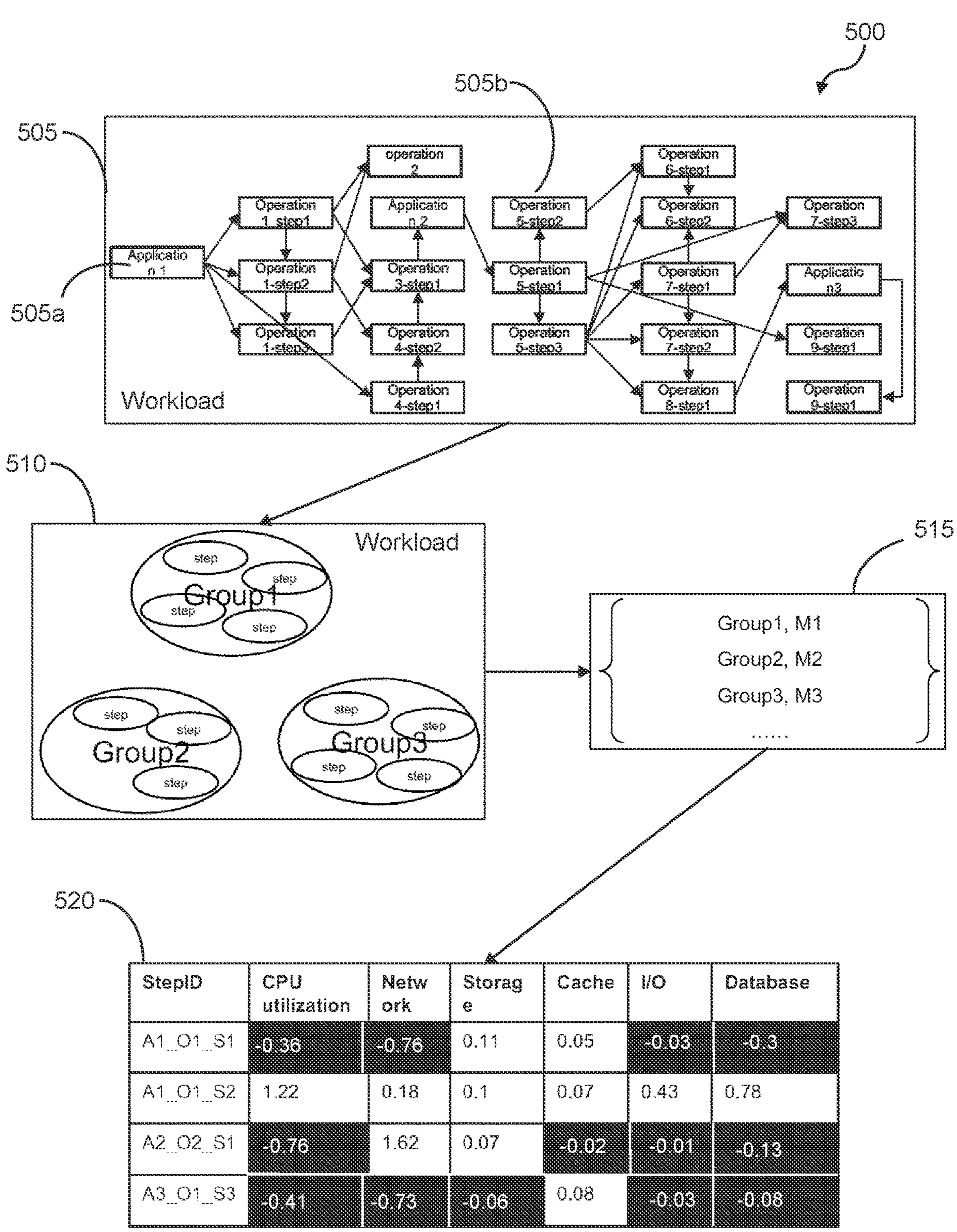
FIG. 5 shows a workflow of an exemplary method in accordance with aspects of the present invention.

FIG. 5 shows a high-level overview of workflow 500 of an exemplary method in accordance with aspects of the present invention. In embodiments, workflow 500 may be carried out in the environment of FIG. 2 using portions of method 300 of FIGS. 3A-B. For example, at block 305 of FIGS. 3A-B, resource reallocation server 205 of FIG. 2 receives or otherwise accesses the workload depicted in block 505 of FIG. 5. As shown, the received/accessed workload of block 505 comprises multiple applications (e.g., application 505*a*) having multiple operations and steps therein (e.g., 505*b* highlighting operation 5-step 2). The dependencies between the applications, operations, and steps are depicted by the arrows.

Block 510 of FIG. 5 depicts model maps for groups 1-3, each group having various steps assigned to them. Specifically, as described above, factor identification module 220 of FIG. 2 divides the workload into groups and generates a model map for every group. Factor identification module 220 redesigns the workload by generating new groups of various steps within the workload. Block 515 of FIG. 5 generally shows that a model is trained with one or more machine learning algorithms for every group to get influence factor for every row of data.

Block 520 of FIG. 5 depicts a table of influence factors for every step of an updated workload. As shown in the first row, the StepID indicates that A1 (application 1), O1 (operation 1), S1 (step 1) has influence factors for each resource element. For example, the influence factor for A1_O1_S1's storage is the highest (e.g., 0.11) and the influence factor for A1_O1_S1's Network usage is the lowest (e.g., –0.76). This means that for A1_O1_S1, storage is the most important factor (i.e., highest priority) to be considered when assigning this step to a specific node during resource reallocation operations. It also means that for A1_O1_S1, network usage is the least important factor (i.e., lowest priority) to be considered when assigning this step to a specific node during resource reallocation operations.

Figure 6:
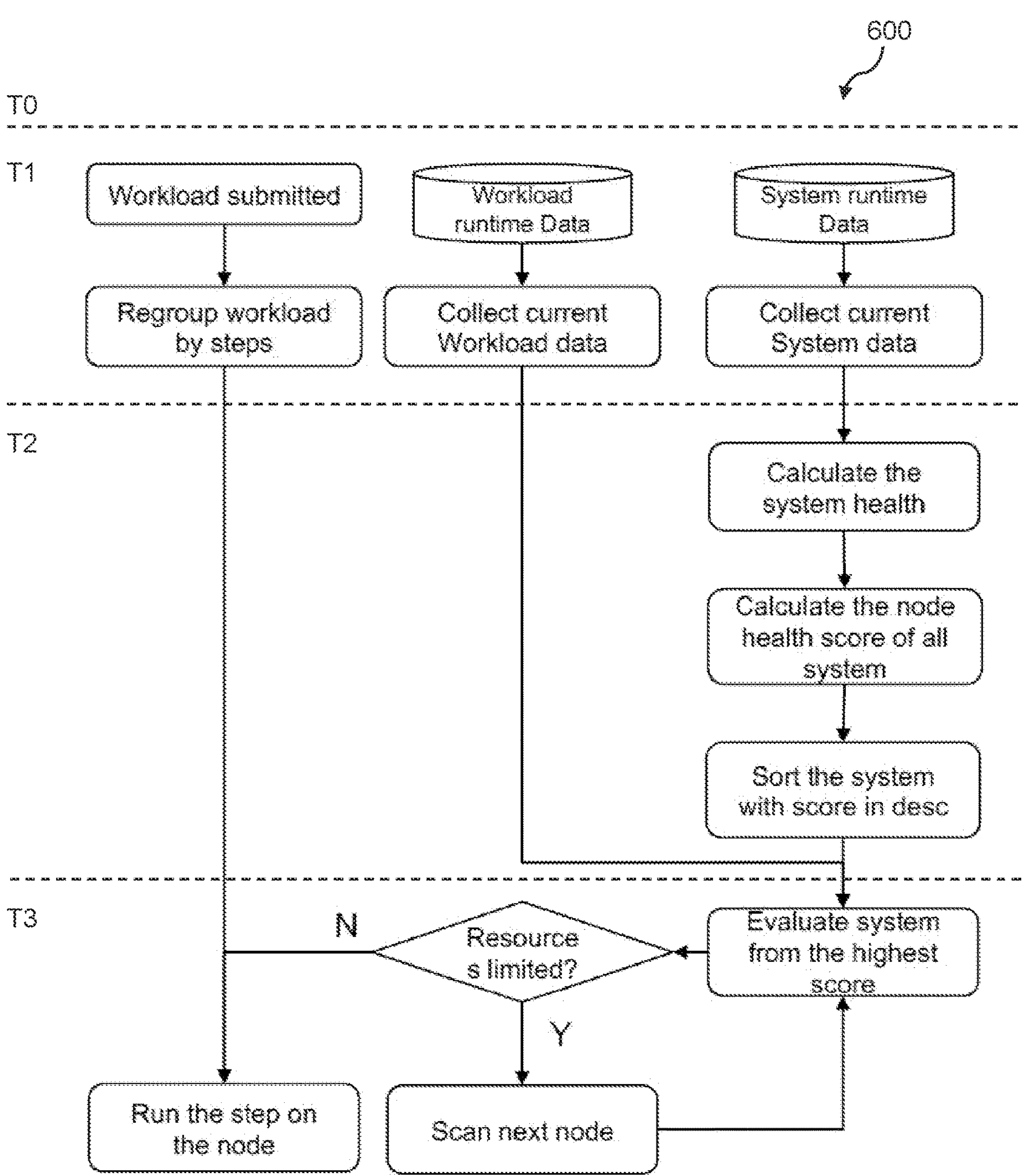
FIG. 6 shows a flowchart of an exemplary method in accordance with aspects of the present invention.

FIG. 6 shows a flowchart an exemplary method 600 in accordance with aspects of the present invention. Steps of method 600 may be carried out in the environment of FIG. 2 and may include portions of method 300 of FIGS. 3A-B. Method 600 describes a scenario when a new workload is being received/accessed, meaning, the workload is a fresh workload and has not been run/processed before. Furthermore, FIG. 6 is divided into four different points in time (e.g., T0, T1, T2, T3), these time references do not indicate a specific length of time, rather they are included to illustrate which operations are occurring during the same relative time period.

Method 600 starts at T0. During method 600's T1, the system receives/accesses a new workload, which means, the workload is a fresh workload and has not been run/processed before. The new workload is processed and regrouped into new workloads, to be run in steps. During that same time, the system begins to collect current workload data and current system data in accordance with the systems and methods described above in FIGS. 2-4.

During method 600's T2, the system calculates system health score(s) based on the methods described above with respect to system scoring module 215 of FIG. 2 and in FIGS. 3-4. During this time, the system will also calculate node health score(s) for each node within the system. Then using the combined system health score(s) and the node health score(s), the system sorts the calculated scores in descending order.

During method 600's T3, the system evaluates the calculated scores, beginning with the highest score, to determine whether the resources for performing a workload step are limited (i.e., whether the target node is healthy/unhealthy and able/unable to perform the task and whether the current system data is below/above a threshold). When resources are not limited (i.e., are healthy) and when the current system data is below a threshold, the step will run on the target node (i.e., the intended node). When the resources are limited, meaning it presents an unhealthy condition for the node and/or the current system data is above a threshold, the system scans the next highest node. This cycle repeats until a suitable node is found to perform the step. When the target node or another suitable node is selected, the workload step runs on the selected/determined node.

Figure 7:
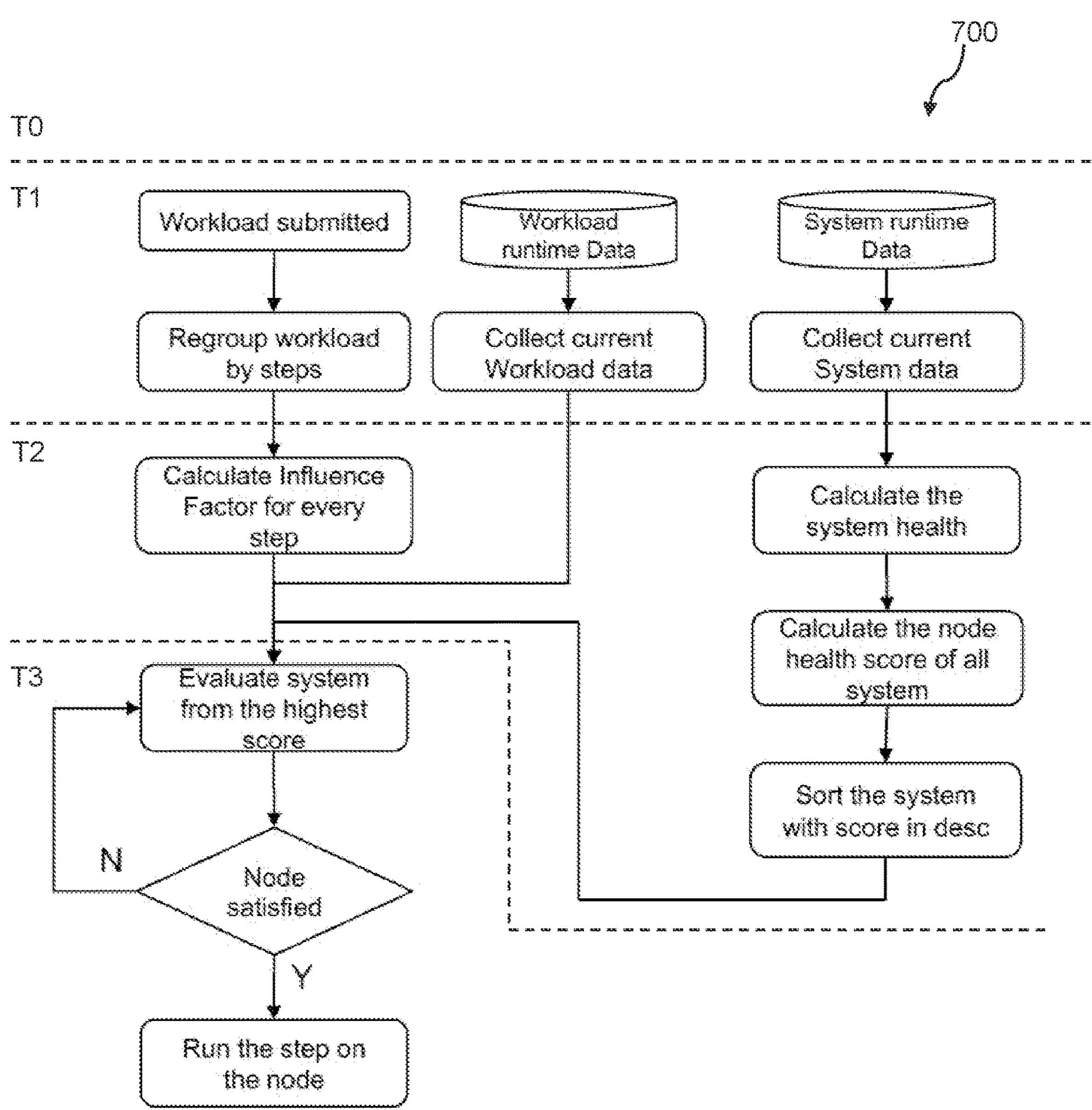
FIG. 7 shows a flowchart of an exemplary method in accordance with aspects of the present invention.

FIG. 7 shows a flowchart an exemplary method 700 in accordance with aspects of the present invention. Steps of method 700 may be carried out in the environment of FIG. 2 and are described with reference to elements depicted in FIG. 2 and may include portions of method 300 of FIGS. 3A-B. Method 700 describes a scenario when a workload has been run before and when a workload runtime history is available. Furthermore, FIG. 7 is divided into four different points in time (e.g., T0, T1, T2, T3), these time references do not indicate a specific length of time, rather they are included to illustrate which operations are occurring during the same relative time period. In embodiments, four different points in time (e.g., T0, T1, T2, T3) as shown in FIG. 7 are the same as the four different points in time (e.g., T0, T1, T2, T3) shown in FIG. 6. In additional embodiments, the four different points in time shown in FIGS. 6 and 7 are different and/or unrelated.

Method 700 starts at T0. During method 700's T1, the system receives/accesses a workload having historical data meaning, the workload has been run/processed before. The new workload is processed and regrouped into new workloads, to be run in steps. During that same time, the system begins to collect current workload data and current system data in accordance with the systems and methods described above in FIGS. 2-4.

During method 700's T2, the system calculates influence factor(s) for every workload step in the methods described above with respect to factor identification module 220 of FIG. 2 and in FIGS. 3-4. As described above, calculating the influence factor(s) provides which resource is the most important for performing that workload step. Also, during T2, the system calculates system health score(s) based on the methods described above with respect to system scoring module 215 of FIG. 2 and in FIGS. 3-4. During this time, the system will also calculate node health score(s) for each node within the system. Then using the combined system health score(s) and the node health score(s), the system sorts the calculated scores in descending order.

During method 700's T3, the system evaluates the calculated scores, beginning with the highest score, to determine whether the resources for performing a workload step are limited (i.e., whether the target node is healthy/unhealthy and able/unable to perform the task, whether the current system data is below/above a threshold, and whether there is no/limited influence for the step). When resources are not limited (i.e., are healthy), when the current system data is below a threshold, and when there is no limited influence (i.e., non-liming) for the step, the step will run on the target node (i.e., the intended node). Alternatively, when the resources are limited, meaning it presents an unhealthy condition for the node, when the current system data is above a threshold, and/or when there is a limited influence for the step, the system scans the next highest node. For example, if the new workload step requires a high percentage of a CPU's capacity, but the current CPU is already operating at a high capacity, the system will need to scan a different node to find a more suitable node for performing the step. This cycle repeats until a suitable node is found to perform the step. When the target node or another suitable node is selected, the workload step runs on the selected/determined node.

In embodiments, a service provider could offer to perform the processes described herein. In this case, the service provider can create, maintain, deploy, support, etc., the computer infrastructure that performs the process steps in accordance with aspects of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In additional embodiments, implementations provide a computer-implemented method, via a network. In this case, a computer infrastructure, such as computer 101 of FIG. 1, can be provided and one or more systems for performing the processes in accordance with aspects of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes in accordance with aspects of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving, by a processor set, a workload for processing;

collecting, by the processor set, historical data and real-time data related to processing the received workload;

generating, by the processor set, a feature map by investigating the received workload, the historical data, and the real-time data, wherein the feature map represents internal and external dependencies of the workload and relationships between workload steps;

dividing, by the processor set, the workload into the workload steps;

assigning, by the processor set, each workload step of the workload steps to one of a plurality of groups based on the feature map;

calculating, by the processor set, system resources for each of the workload steps;

training, by the processor set, a first machine learning model to determine influence factors for each of the plurality of groups; and reallocating, by the processor set, the workload steps to one of a plurality of processing nodes based on the calculated system resources and the influence factors.

2. The computer-implemented method of claim 1, further comprising reformatting, by the processor set, the historical data and the real-time data.

3. The computer-implemented method of claim 1, further comprising generating, by the processor set, an updated feature map based on the calculated system resources for each of the workload steps, wherein the reallocating the workload steps is further based on the updated feature map.

4. The computer-implemented method of claim 1, further comprising training, by the processor set, a second machine learning model to determine a first system score for at least one of the plurality of processing nodes, and wherein the reallocating the workload steps is further based on the first system score.

5. The computer-implemented method of claim 4, further comprising retraining, by the processor set, the second machine learning model to determine a second system score for the at least one of the plurality of processing nodes when the first system score exceeds a first threshold, and wherein the reallocating the workload steps is further based on the second system score.

6. The computer-implemented method of claim 1, further comprising transmitting, by the processor set, the reallocated workload steps as an updated processing workload for processing by a selected processing node.

7. The computer-implemented method of claim 6, wherein the selected processing node is selected based on determining whether a target node is healthy and whether a current system data is below a second threshold.

8. The computer-implemented method of claim 6, wherein the selected processing node is selected based on determining whether a target node is healthy, whether a current system data is below a second threshold, and whether an influence factor of the influence factors is non-limiting.

9. A computer program product comprising one or more computer readable storage media having program instructions collectively stored on the one or more computer readable storage media, the program instructions executable to:

- receive a workload for processing;
- collect historical data and real-time data related to processing the received workload;
- generate a feature map by investigating the received workload, the historical data, and the real-time data,
  - wherein the feature map represents internal and external dependencies of the workload and relationships between workload steps;
- divide the workload into the workload steps;
- assign each workload step of the workload steps to one of a plurality of groups based on the feature map;
- calculate system resources for each of the workload steps;
- train a first machine learning model to determine influence factors for each of the plurality of groups; and
- reallocate the workload steps to one of a plurality of processing nodes based on the calculated system resources and the influence factors.

10. The computer program product of claim 9, wherein the program instructions are further executable to reformat the historical data and the real-time data.

11. The computer program product of claim 9, wherein the program instructions are further executable to generate an updated feature map based on the calculated system resources for each of the workload steps, wherein the reallocating the workload steps is further based on the updated feature map.

12. The computer program product of claim 9, wherein the program instructions are further executable to train a second machine learning model to determine a first system score for at least one of the plurality of processing nodes, and wherein the reallocating the workload steps is further based on the first system score.

13. The computer program product of claim 12, wherein the program instructions are further executable to retrain the second machine learning model to determine a second system score for the at least one of the plurality of processing nodes when the first system score exceeds a first threshold, and wherein the reallocating the workload steps is further based on the second system score.

14. The computer program product of claim 9, wherein the program instructions are further executable to transmit the reallocated workload steps as an updated processing workload for processing by a selected processing node.

15. The computer program product of claim 14, wherein the selected processing node is selected based on determining whether a target node is healthy and whether a current system data is below a second threshold.

16. The computer program product of claim 14, wherein the selected processing node is selected based on determining whether a target node is healthy, whether a current system data is below a second threshold, and whether an influence factor of the influence factors is non-limiting.

17. A system comprising:

- a processor set, one or more computer readable storage media, and program instructions collectively stored on the one or more computer readable storage media, the program instructions executable to:
- receive a workload for processing;
- collect historical data and real-time data related to processing the received workload;
- generate a feature map by investigating the received workload, the historical data, and the real-time data,
  - wherein the feature map represents internal and external dependencies of the workload and relationships between workload steps;
- divide the workload into the workload steps;
- assign each workload step of the workload steps to one of a plurality of groups based on the feature map;
- calculate system resources for each of the workload steps;
- train a first machine learning model to determine influence factors for each of the plurality of groups; and
- reallocate the workload steps to one of a plurality of processing nodes based on the calculated system resources and the influence factors.

18. The system of claim 17, wherein the program instructions are further executable to generate an updated feature map based on the calculated system resources for each of the workload steps, wherein the reallocating the workload steps is further based on the updated feature map.

19. The system of claim 17, wherein the program instructions are further executable to train a second machine learning model to determine a first system score for at least one of the plurality of processing nodes, and wherein the reallocating the workload steps is further based on the first system score.

20. The system of claim 19, wherein the program instructions are further executable to retrain the second machine learning model to determine a second system score for the at least one of the plurality of processing nodes when the first system score exceeds a first threshold, and wherein the reallocating the workload steps is further based on the second system score.

* * * * *